C. S. MARTIN.
Carriage-Spring.
No. 2,271. Reissued June 5, 1866.
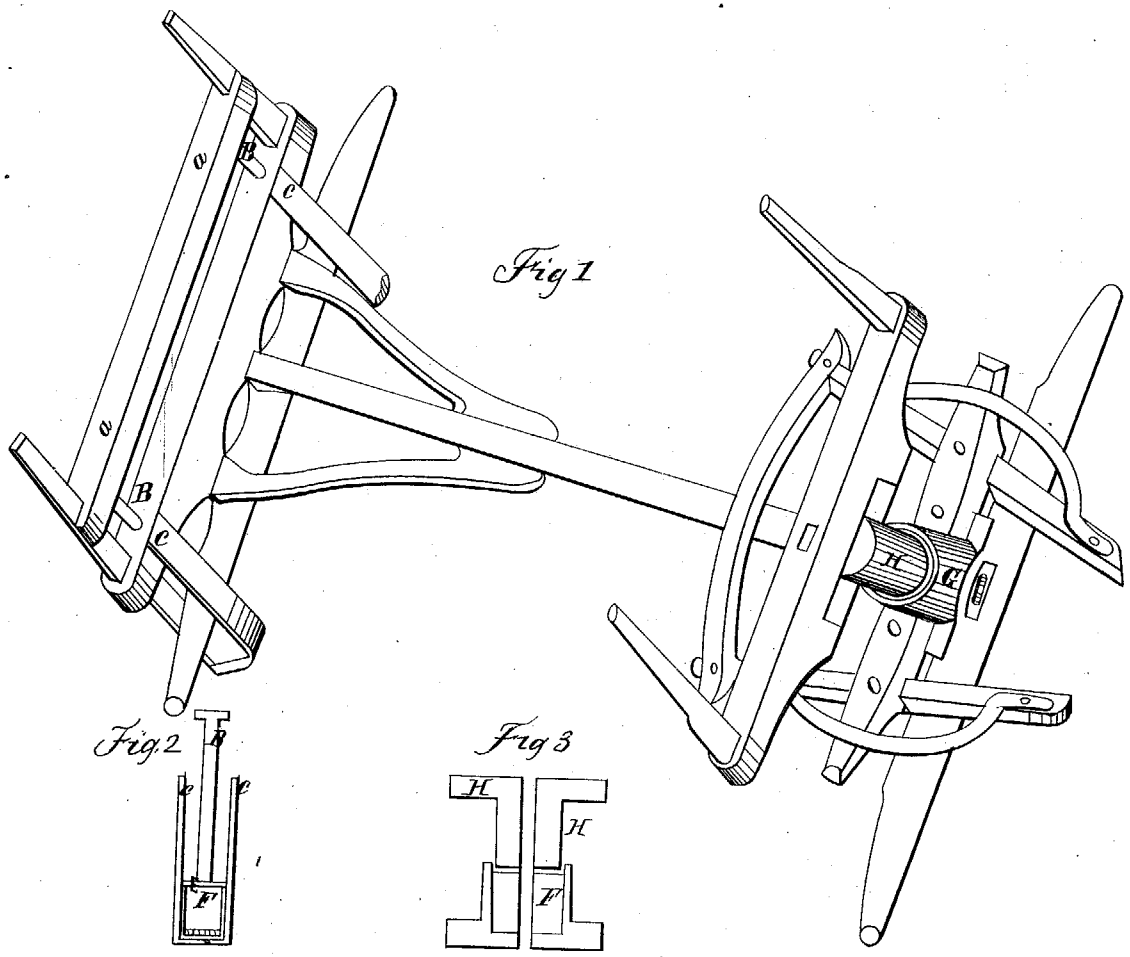
Witnesses
T T Prosser
P A Hoyne
Inventor;
Charles S Martin
N. PETERS, PHOTO-LITHOGRAPHER, WASHINGTON, D. C.

UNITED STATES PATENT OFFICE.

CHARLES S. MARTIN, OF MILWAUKEE, WISCONSIN.

IMPROVEMENT IN ATTACHING SPRINGS TO WAGONS.

Specification forming part of Letters Patent No. 41,520, dated February 9, 1864; Reissue No. 2,271, dated June 5, 1866.

DIVISION A.

*To all whom it may concern:*

Be it known that I, CHARLES S. MARTIN, of Milwaukee, (late of Mackford,) in the county of Milwaukee and State of Wisconsin, have invented a new and useful Improvement in Farm-Wagons; and I do hereby declare that the following is a full, clear, and exact description of the same, reference being had to the accompanying drawings, made part of this specification, in which—

Figure 1 is a perspective view of the running-gear of a wagon containing my improvement. Fig. 2 is a section of the hind axle, showing the mode of resting the load upon the india-rubber spring. Fig. 3 is a section, showing the mode of attaching the forward bolster, which is not important as forming part of this specification.

In the different figures the same letters refer to identical parts.

In the drawings, F is a block of elastic rubber having a stirrup, C, connecting it with the bolster of the wagon, by which it is suspended. Upon this block of india-rubber is placed a plate, E, on the center of which rests the rod B, which, in the case shown, passes through holes made in the bolster and axle.

There are springs on each end of the hind axle, and the bolts B B have flattened heads, as shown in Fig. 2.

A is the spring-bar on which rests the rear end of the bed or load. This spring-bar moves freely up and down upon the standards, which serve as guides working in notches in the end of the spring-bar, or other equivalent devices.

The spring-bar rests on the heads of the bolts B. The weight of the load is thus borne, by means of the spring-bar A, bars B B, and plates E, directly upon the elastic rubber springs.

I do not limit my claim to the precise number of springs and rods here described—more may be employed if necessary—nor to rods passing through the bolster and axle, or either; but I wish to cover the equivalents of the mode I have described for sustaining the load upon the india-rubber springs.

What I claim as my invention, and seek to secure by Letters Patent, is—

The spring-bar A and rods B B, when used for the purpose of sustaining the load on the hind axle of a wagon, in combination with the india-rubber springs F, substantially in the manner set forth.

In testimony whereof I have signed my name to this specification before two subscribing witnesses.

CHARLES S. MARTIN.

Witnesses:

JOHN S. HOLLINGSHEAD,
JOHN D. BLOOR.